United States Patent [19]

Suganuma et al.

[11] Patent Number: 5,205,851
[45] Date of Patent: Apr. 27, 1993

[54] METHOD AND APPARATUS FOR PRODUCING OPTICAL FIBER COUPLER

[75] Inventors: Hiroshi Suganuma; Hiroaki Takimoto; Hiroshi Yokota; Masumi Fukuma, all of Yokohama; Kazuhiko Arimoto, Tokyo, all of Japan

[73] Assignees: Sumitomo Electric Industries, Ltd.; Sumiden Opcom Ltd., both of Osaka, Japan

[21] Appl. No.: 766,202

[22] Filed: Sep. 27, 1991

[30] Foreign Application Priority Data

Oct. 12, 1990 [JP] Japan ................................. 2-274825
Nov. 26, 1990 [JP] Japan ................................. 2-323516
Nov. 26, 1990 [JP] Japan ................................. 2-323517

[51] Int. Cl.$^5$ ............................................. C03B 37/10
[52] U.S. Cl. ........................... 65/4.21; 65/3.11; 65/11.1
[58] Field of Search ............... 65/2, 3.12, 11.1, 3.11, 65/4.2, 4.21, 16

[56] References Cited

U.S. PATENT DOCUMENTS

| | | | |
|---|---|---|---|
| 4,159,200 | 6/1979 | Shono et al. | 65/2 X |
| 4,263,032 | 4/1981 | Sinclair et al. | 65/3.12 |
| 4,295,870 | 10/1981 | Schneider et al. | 65/3.12 |
| 4,645,451 | 2/1987 | Schneider et al. | 431/278 |
| 4,682,994 | 7/1987 | Mansfield | 65/3.12 |
| 4,763,272 | 8/1988 | McLandrich | 65/4.2 X |
| 4,997,247 | 3/1991 | Stowe | 65/4.2 X |
| 5,030,265 | 7/1991 | Suzuki et al. | 65/4.2 |
| 5,046,804 | 9/1991 | Fukuma et al. | 385/43 |
| 5,098,459 | 3/1992 | Fukuma | 65/4.21 |

FOREIGN PATENT DOCUMENTS

| | | |
|---|---|---|
| 0370465 | 5/1990 | European Pat. Off. . |
| 3400710 | 7/1985 | Fed. Rep. of Germany . |
| 1249463 | 11/1961 | France . |
| 64-21405 | 1/1989 | Japan . |
| 2-118606 | 2/1990 | Japan . |
| 8910901 | 11/1989 | World Int. Prop. O. . |

OTHER PUBLICATIONS

Patent Abstracts of Japan, vol. 14, No. 341. (P1081) Jul. 24, 1990.

Primary Examiner—Robert L. Lindsay
Attorney, Agent, or Firm—Sandler Greenblum & Bernstein

[57] ABSTRACT

In a method of producing an optical fiber coupler, in which glass portions of a plurality of optical fibers are heated so as to be fusion bonded to each other and then, are heated so as to be stretched, the improvement comprising: a gas burner which acts as a heat source and has a plurality of gas nozzles arranged in an axial direction of the optical fibers so as to be fixed in position during heating of the glass portions.

18 Claims, 5 Drawing Sheets

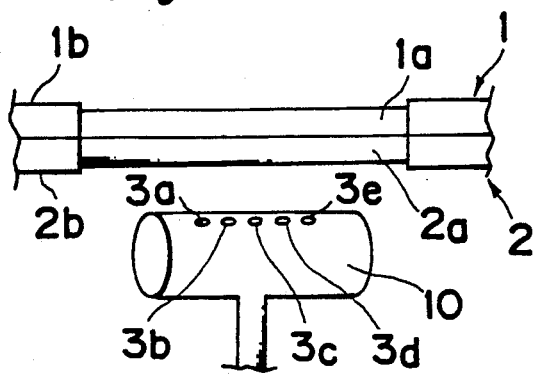
Fig. 1
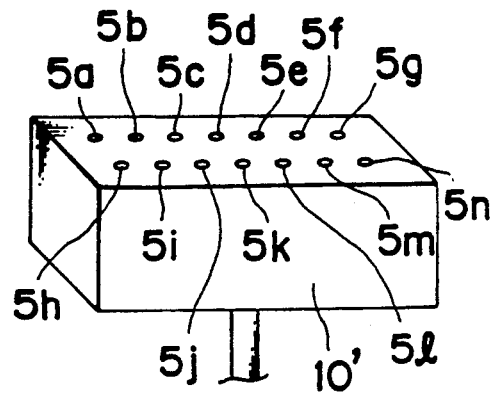
Fig. 2
Fig. 3 PRIOR ART
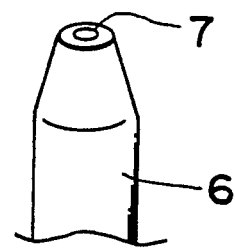
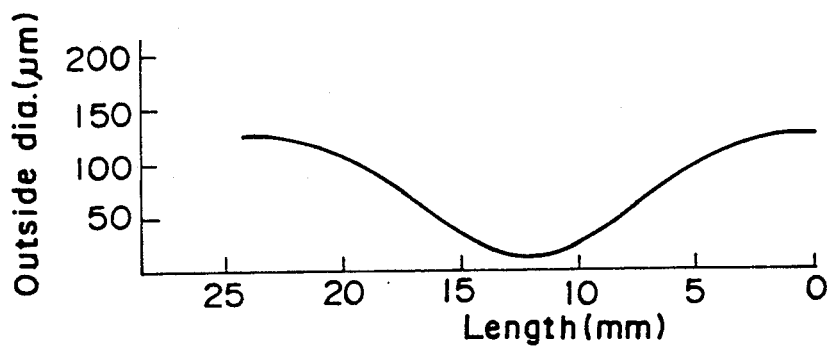
Fig. 4
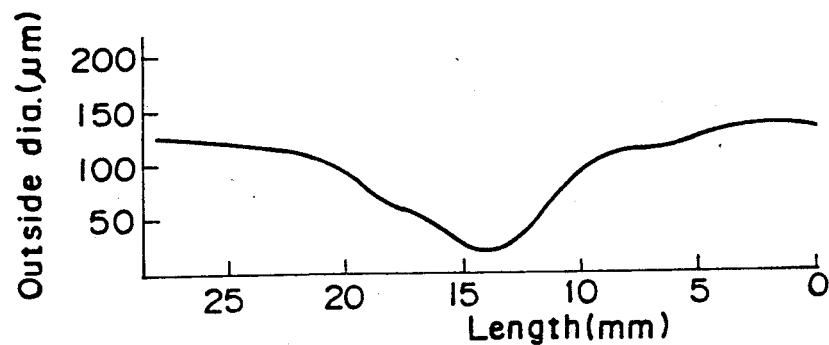
Fig. 5 PRIOR ART

METHOD AND APPARATUS FOR PRODUCING OPTICAL FIBER COUPLER

BACKGROUND OF THE INVENTION

The present invention generally relates to optical fiber couplers used in optical communication, measurement, etc. and more particularly, to a method of producing an optical fiber coupler, in which glass portions of a plurality of optical fibers are fusion bonded to each other and stretched.

When an optical communication system or an optical data link network is constructed, an optical directional coupler for distributing, at a desired ratio, an optical signal delivered from a light source is a vital constituent element. One example of the optical directional coupler is an optical fiber coupler. Usually, the optical fiber coupler is produced as follows. Namely, a plurality of optical fibers are stranded or arranged in parallel and then, glass portions of the optical fibers are heated by using a heat source such as an acetylene gas burner so as to be fusion bonded to each other integrally. Subsequently, the integral glass portions are further heated and stretched under a constant tension so as to be tapered.

In a known method disclosed in, for example, Japanese Patent Laid-Open Publication No. 64-21405, when glass portions of a plurality of optical fibers, which are secured by a pair of clampers, are heated by a gas burner acting as a heat source so as to be fusion bonded to each other and stretched, a gas burner 6 having a single gas nozzle 7 as shown in FIG. 3 is reciprocated in parallel with an axial direction of the optical fibers. This is because in order to obtain an optical fiber coupler having excellent characteristics, it is desirable that the glass portions of the optical fibers are uniformly heated over a length of about 5 mm so as to be fusion bonded to each other and stretched. However, the known method has the following drawbacks (1) and (2).

(1) Since reciprocation of the gas burner 6 is stopped at one end of the glass portions and then, is started towards the other end of the glass portions, heating period of the opposite ends of the glass portions becomes longer relatively and thus, heating temperature of the opposite ends of the glass portions is likely to become higher than that of the remaining part of the glass portions. Therefore, in the fusion bonding process, joining degree of the glass portions of the optical fibers rises only at the opposite ends of the glass portions. Meanwhile, in the stretching process, only the opposite ends of the glass portions are stretched sufficiently. Thus, the stretched glass portions have an uneven shape in the axial direction of the optical fibers. As a result, an optical fiber coupler having excellent characteristics cannot be produced at high reproducibility.

(2) In the stretching process, the glass portions are heated under a constant tension so as to be stretched. However, if such a phenomenon takes place during the stretching process that the tension varies or heating temperature varies due to wavering of a flame, etc., stretching speed changes only at a location of the glass portions, which is being heated by the gas burner 6 at the time of occurrence of the variation, relative to the remaining locations of the glass portions. Therefore, the stretched glass portions are likely to have an uneven shape in the axial direction of the optical fibers. As a result, an optical fiber coupler having excellent characteristics cannot be produced at high reproducibility.

SUMMARY OF THE INVENTION

Accordingly, an essential object of the present invention is, with a view to eliminating the above mentioned inconveniences of the known method, to provide a method of producing an optical fiber coupler, in which by cancelling motion of a gas burner during heating, a problem resulting from motion of the gas burner is solved such that heating can be performed stably, whereby an optical fiber coupler having excellent characteristics can be produced at high reproducibility.

In order to accomplish this object of the present invention, there is provided in one embodiment of the present invention, a method of producing an optical fiber coupler, in which glass portions of a plurality of optical fibers are heated so as to be fusion bonded to each other and then, are heated so as to be stretched, the improvement comprising: a gas burner which acts as a heat source and has a plurality of gas nozzles arranged in an axial direction of the optical fibers so as to be fixed in position during heating of the glass portions.

Propane, mixture of oxygen and acetylene, mixture of oxygen and hydrogen, oxygen, etc. can be used as combustion gas supplied to the gas burner.

In a known gas burner 6 shown in FIG. 3, since only one gas nozzle 7 is provided, its heating area is narrow. Thus, if glass portions of two optical fibers are heated by the gas burner 6 without reciprocating the gas burner 6, length of the integral glass portions to be stretched becomes insufficient and thus, an optical fiber coupler having excellent characteristics cannot be obtained.

On the other hand, in the method of the present invention, since the gas burner having a plurality of the gas nozzles arranged in the axial direction of the optical fibers is used, a whole heating area of the glass portions can be heated to uniform temperature by the gas burner fixed in position.

BRIEF DESCRIPTION OF THE DRAWINGS

This object and features of the present invention will become apparent from the following description taken in conjunction with the preferred embodiments thereof with reference to the accompanying drawings, in which:

FIG. 1 is a perspective view of a gas burner employed in a method of producing an optical fiber coupler, according to a first embodiment of the present invention;

FIG. 2 is a perspective view of a gas burner which is a modification of the gas burner of FIG. 1;

FIG. 3 is a perspective view of a prior art gas burner (already referred to);

FIG. 4 is graph showing taper of stretched integral glass portions of optical fibers, which is obtained by using the gas burner of FIG. 2;

FIG. 5 is a graph showing taper of stretched integral glass portions of optical fibers, which is obtained by using the gas burner of the prior art gas burner of FIG. 3;

Before the description of the present invention proceeds, it is to be noted that like parts are designated by like reference numerals throughout several views of the accompanying drawings.

DETAILED DESCRIPTION OF THE INVENTION

Figure 6:
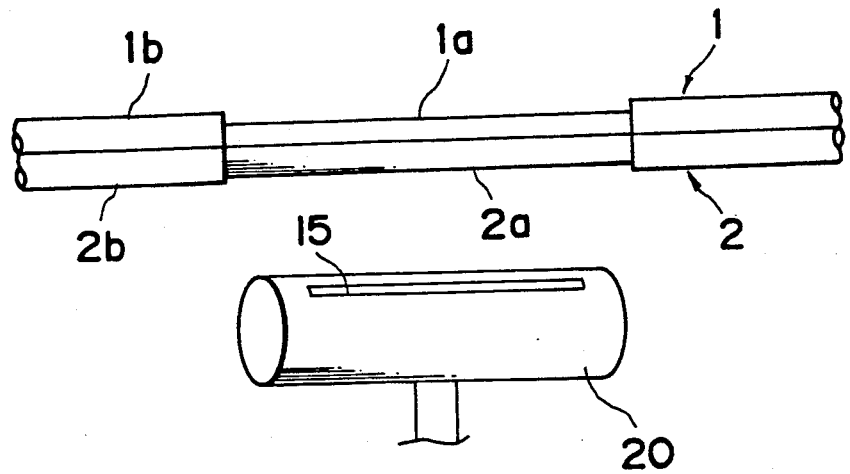
FIG. 6 is a perspective view of a gas burner employed in a production method according to a second embodiment of the present invention.

Referring now to the drawings, there is shown in FIG. 1, a gas burner 10 employed in a method of producing an optical fiber coupler, according to a first embodiment of the present invention. In FIG. 1, the gas burner 10 has a plurality of gas nozzles 3a, 3b, 3c, 3d and 3e and acts as a heating device for heating glass portions 1a and 2a of optical fibers 1 and 2 extending in parallel along each other. The gas burner 10 is used not only for heating the glass portions 1a and 2a so as to fusion bond the glass portions 1a and 2a but for heating the glass portions 1a and 2a so as to stretch the glass portions 1a and 2a. The glass portions 1a and 2a are obtained by partially removing coating layers 1b and 2b from the optical fibers 1 and 2, respectively. The gas nozzles 3a to 3e are arranged in a line extending in parallel with an axial direction of the optical fibers 1 and 2. Therefore, a long distance of the glass portions 1a and 2a can be heated by the gas burner 10 fixed in position. Meanwhile, combustion gas such as propane, mixture of oxygen and acetylene, mixture of oxygen and hydrogen, oxygen, etc. can be used for the gas burner 10.

FIG. 2 shows a gas burner 10' which is a modification of the gas burner 10. The gas burner 10' has two rows of gas nozzles 5a-5g and 5h-5n. In one example of the gas burner 10', the gas burner 10' has an overall length of 10 mm, each of the gas nozzles 5a-5n has a diameter of 0.5 mm and the gas nozzles 5a-5g or 5h-5n are provided at an interval of 1.0 mm in each row of the gas nozzles 5a-5n.

Hereinbelow, experiments in which optical fiber couplers are produced by using the gas burner 10' are described. Two single-mode optical fibers are used as the optical fibers 1 and 2. A coating layer is removed over a length of about 30 mm from each optical fiber such that a glass portion of each optical fiber is obtained. Then, the glass portions are so secured as to extend in parallel along each other. Subsequently, the glass portions are heated by the gas burner 10' for 2 min. so as to be fusion bonded to each other integrally. At this time, oxygen and propane gas are, respectively, used as combustion gas at flow rates of 110 cc/min. and 55 cc/min. In the next stretching step, while opposite portions of the optical fibers, which interpose the integral glass portions, respectively therebetween, are being subjected to a tension of 3 g, the integral glass portions are again heated by the gas burner 10' so as to be stretched. Then, light from a light source is introduced into one end of the two optical fibers. A laser diode having a wavelength of 1.3 μm is used as the light source. While light emitted from the other end of the two optical fibers is being monitored, the integral glass portions are stretched. Thus, at the time when intensity of light emitted by one of the optical fibers becomes identical with that of the other of the optical fibers, stretching of the integral glass portions is terminated.

By the above described production method, 50 optical fiber couplers have been produced. Each of the obtained optical fiber couplers has a coupling ratio of 50±1% and an excess loss of 0.20 dB or less. By measuring shape of the stretched integral glass portions of each of the optical fiber couplers, a smooth taper free from uneven portions as shown in FIG. 4 is obtained at remarkably high reproducibility.

For comparison, 50 optical fiber couplers are produced in a method in which a known gas burner of FIG. 3 is reciprocated through a stroke of 10 mm. The obtained optical fiber couplers have a coupling ratio of 50±5% but their excess loss fluctuates greatly from 0.10 to 0.80 dB. Furthermore, by measuring shape of the stretched integral glass portions of each of the optical fiber couplers, an uneven taper is obtained as shown in FIG. 5.

As is clear from the foregoing description, in the production method according to the first embodiment of the present invention, the glass portions of the two optical fibers are integrally fusion bonded to each other uniformly and the stretched integral glass portions of the optical fibers have excellent shape at remarkably high reproducibility. Therefore, in accordance with the first embodiment of the present invention, the optical fiber couplers having excellent characteristics can be produced stably.

FIG. 6 shows a gas burner 20 employed in a production method according to a second embodiment of the present invention. The gas burner 20 has a slitlike gas nozzle 15 longitudinally extending in parallel with the axial direction of the optical fibers 1 and 2. During heating of the glass portions 1a and 2a of the optical fibers 1 and 2, the gas burner 20 is fixed in position.

Figure 7:
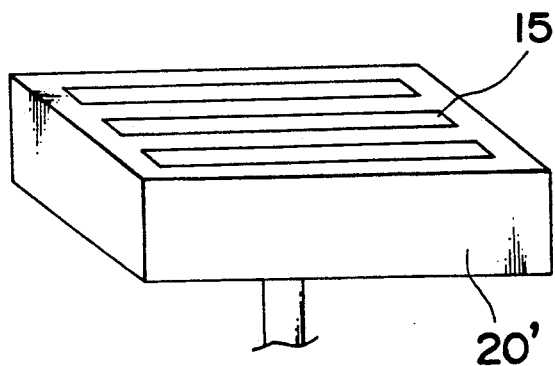
FIG. 7 is a perspective view of a gas burner which is a modification of the gas burner of FIG. 6.

In a modified gas burner 20' shown in FIG. 7, a plurality of, for example, three gas nozzles 15 are provided.

In a concrete example, optical fiber couplers are produced by using the gas burner 20 of FIG. 6 in which the gas nozzle 15 has a width of 0.2 mm and a length of 10 mm. Two single-mode optical fibers are used as the optical fibers 1 and 2. A coating layer is removed over a length of about 30 mm from each optical fiber such that a glass portion of each optical fiber is obtained. Then, the glass portions are so secured as to extend in parallel along each other. Subsequently, the glass portions are heated by the gas burner 20 for 1 min. so as to be fusion bonded to each other integrally. At this time, oxygen and propane gas are, respectively, used as combustion gas at flow rates of 130 cc/min. and 65 cc/min. Thereafter, while opposite portions of the optical fibers, which interpose the glass portions, respectively therebetween, are being subjected to a tension of 3 g, the integral glass portions are again heated by the gas burner 20 so as to be stretched. Then, light from a laser diode is introduced into one end of the two optical fibers. While light emitted from the other end of the two optical fibers is being monitored, the integral glass portions are stretched. Thus, at the time when intensity of light emitted by one of the optical fibers becomes identical with that of the other of the optical fibers, stretching of the integral glass portions is terminated.

By the above described production method, 100 optical fiber couplers are produced. Evaluation of characteristics of the optical fiber couplers has revealed that each of the optical fiber couplers has such excellent characteristics as a coupling ratio of 50±1% and an excess ratio of 0.20 dB or less.

By measuring shape of the stretched integral glass portions of each of the optical fiber couplers, a smooth taper free from uneven portions as shown in FIG. 4 is obtained at remarkably high reproducibility.

As will be seen from the foregoing description, in the production method according to the second embodiment of the present invention, the glass portions of the two optical fibers are integrally fusion bonded to each other uniformly and the stretched integral glass portions of the optical fibers have excellent shape at remarkably high reproducibility. Therefore, in accordance with the second embodiment of the present invention, the optical fiber couplers having excellent characteristics can be produced stably.

Figure 8:
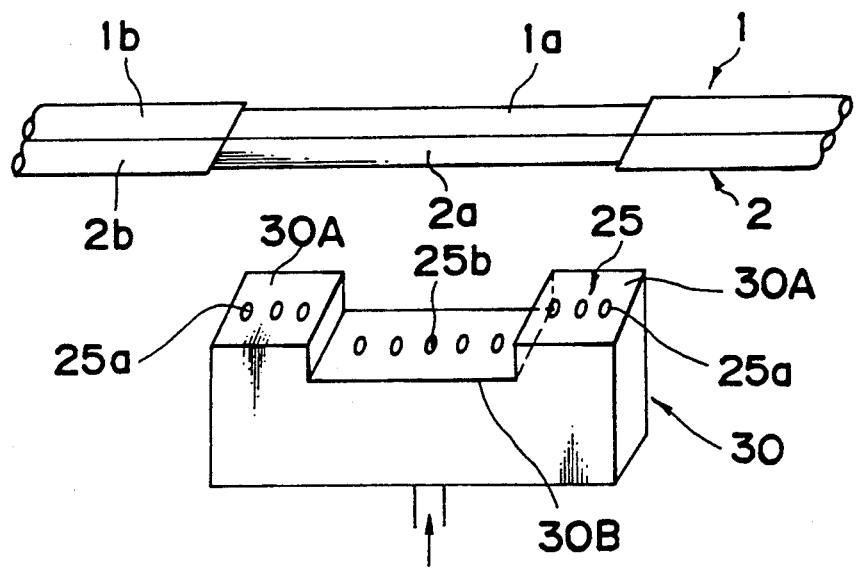
FIG. 8 is a perspective view of a gas burner employed in a production method according to a third embodiment of the present invention.

FIG. 8 shows a substantially U-shaped gas burner 30 employed in a production method according to a third embodiment of the present invention. The gas burner 30 has a plurality of gas nozzles 25 arranged in a line extending in parallel with the axial direction of the optical fibers 1 and 2. A pair of flat upper faces 30A are formed at opposite end portions of the gas burner 30, while a recessed flat upper face 30B is formed at a central portion of the gas burner 30 so as to be interposed between the flat upper faces 30A. The recessed flat upper face 30B is disposed downwardly from the flat upper faces 30A relative to the glass portions 1a and 2a. The gas nozzles 25 includes gas nozzles 25a and 25b which are, respectively, provided on the flat upper faces 30A and the recessed flat upper face 30B. Therefore, the gas nozzles 25b on the recessed flat upper face 30B are spaced farther away from the glass portions 1a and 2a than the gas nozzles 25a on the flat upper faces 30A are. Since the gas burner 30 has a plurality of the gas nozzles 25, the gas burner 30 is fixed in position during heating of the glass portions 1a and 2a.

Figure 9A:
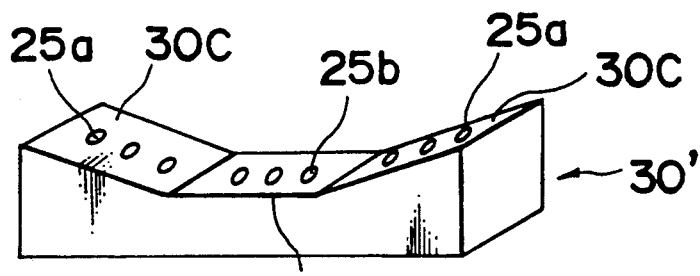
FIGS. 9a to 9c are perspective views of gas burners which are first to third modifications of the gas burner of FIG. 8, respectively.
Figure 9B:
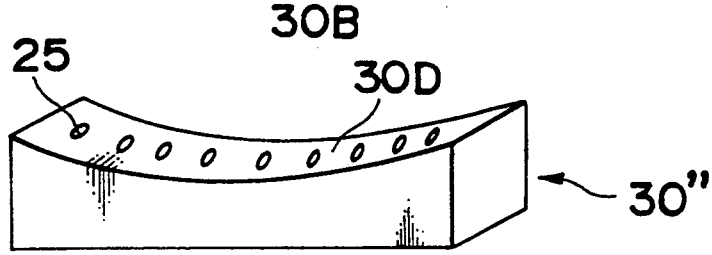
Figure 9C:
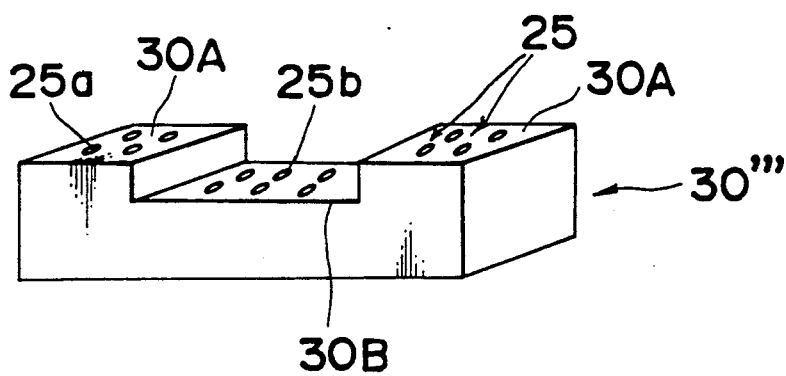

FIGS. 9a, 9b and 9c show gas burners 30', 30" and 30''' which are first, second and third modifications of the gas burner 30, respectively. In the gas burner 30' of FIG. 9a, a pair of the flat upper faces 30A of the burner 30 are replaced by a pair of oblique upper faces 30C inclined downwardly towards the recessed flat upper face 30B. The gas burner 30" of FIG. 9b has a concavely arcuate upper face 30D. In the gas burner 30''' of FIG. 9c, a plurality of, for example, two rows of the gas nozzles 25 are formed on the flat upper faces 30A and the recessed flat upper face 30B.

In a concrete example, optical fiber couplers are produced by using the gas burner 30. The gas burner 30 has an overall length of 18 mm, each of the gas nozzles 25 has a diameter of 0.3 mm and the gas nozzles 25 are provided at an interval of 1.5 mm. Since the number of the gas nozzles 25a on the opposite flat upper faces 30A is 6 and the number of the gas nozzles 25b on the central recessed flat upper face 30B is 5, a total of 11 gas nozzles 25 are provided. Based on the same remaining production conditions as those of the concrete example of FIG. 6 in the second embodiment of the present invention, 100 optical fiber couplers are produced. Evaluation of characteristics of the optical fiber couplers has shown that each of the optical fiber couplers has such excellent characteristics as a coupling ratio of 50±1% and an excess ratio of 0.10 dB or less.

Figure 10:
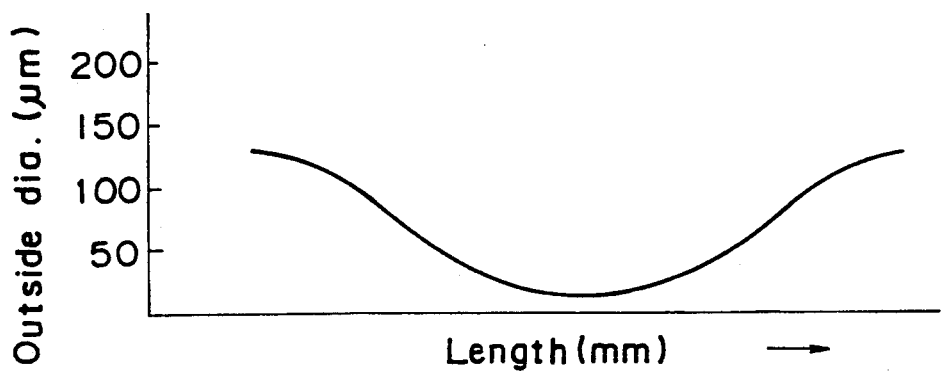
FIG. 10 is a graph showing taper of stretched integral glass portions of optical fibers, which is obtained by using the gas burner of FIG. 8.

Meanwhile, by measuring shape of the stretched integral glass portions of each of the optical fiber couplers, a smooth taper free from uneven portions as shown in FIG. 10 is obtained at remarkably high reproducibility. Since the gas burner 30 is substantially U-shaped, temperature distribution of the gas burner 30 is more uniform than that of the gas burners 10 and 20 of FIGS. 1 and 6 and thus, the gas burner 30 has more excellent performance than the gas burners 10 and 20. Therefore, the taper (FIG. 10) of the stretched integral glass portions obtained by the gas burner 30 is gentler than that (FIG. 4) obtained by the gas burners 10 and 20. As a result, optical loss of the optical fiber couplers obtained by the gas burner 30 becomes less than that obtained by the gas burners 10 and 20.

As will be seen from the foregoing description, in the production method according to the third embodiment of the present invention, the glass portions of the two optical fibers are integrally fusion bonded to each other uniformly and the stretched integral glass portions of the optical fibers have excellent shape at remarkably high reproducibility. Therefore, in accordance with the third embodiment of the present invention, the optical fiber couplers having excellent characteristics can be produced stably.

Figure 11:
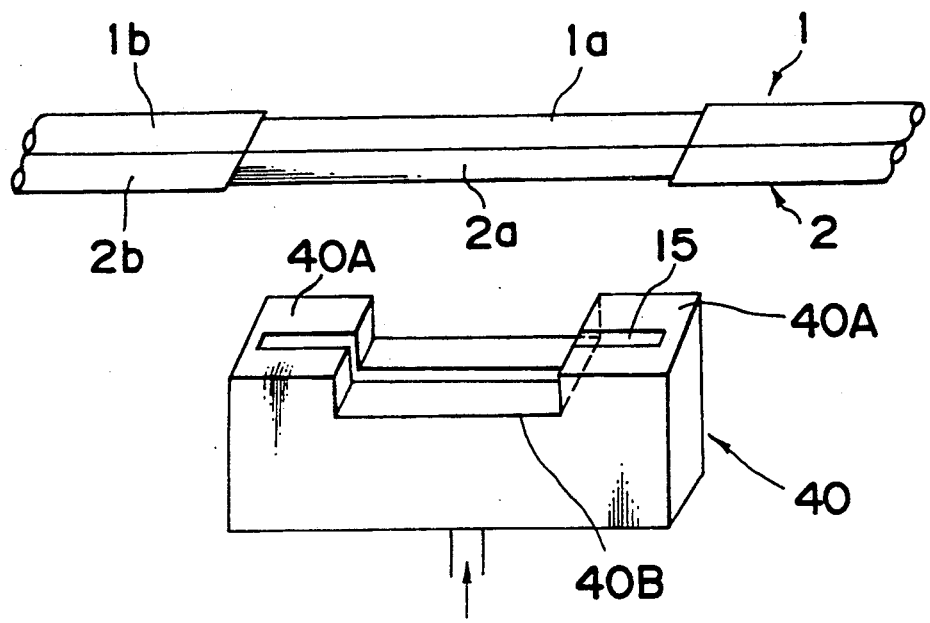
FIG. 11 is a perspective view of a gas burner employed in a production method according to a fourth embodiment of the present invention.
Figure 12A:
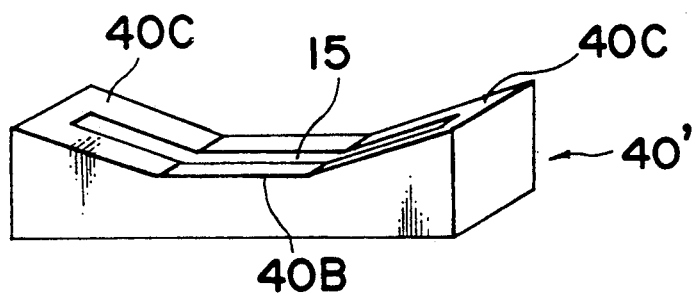
FIGS. 12a to 12c are perspective views of gas burners which are first to third modifications of the gas burner of FIG. 11, respectively.
Figure 12B:
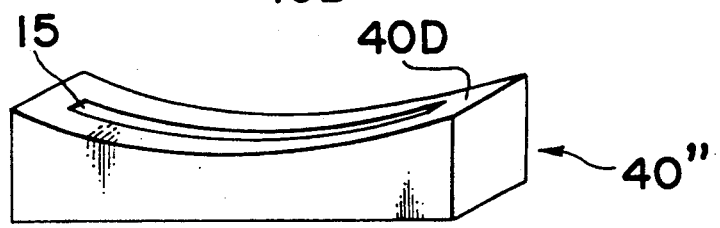
Figure 12C:
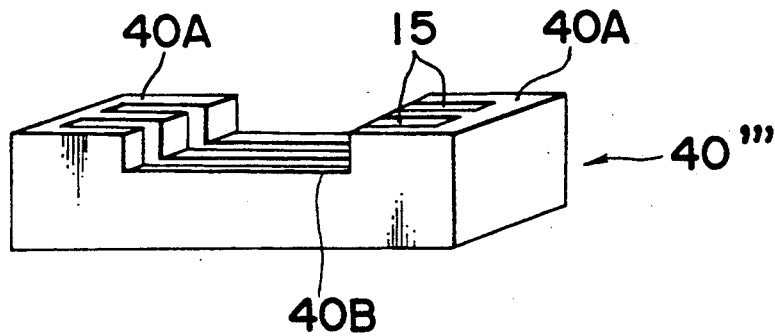

Furthermore, FIG. 11 shows a substantially U-shaped gas burner 40 employed in a production method according to a fourth embodiment of the present invention, while FIGS. 12a to 12c show gas burners 40', 40" and 40''' which are first to third modifications of the gas burner 40, respectively. The gas burners 40 and 40' to 40''' are similar to the gas burners 30 (FIG. 8) and 30' to 30''' (FIGS. 9a to 9c), respectively and have burner bodies identical with those of the gas burners 30 and 30' to 30''', respectively. In the gas nozzles 40 and 40' to 40''', the gas nozzles 25 of FIG. 8 are replaced by the slitlike gas nozzle 15 (FIG. 6). Since other constructions of the gas burners 40 and 40' to 40''' are similar to those of the gas nozzles 30 and 30' to 30''', respectively, description thereof is abbreviated for the sake of brevity.

In accordance with the fourth embodiment of the present invention, the optical fiber couplers having excellent characteristics can be produced stably in the same manner as in the third embodiment of the present invention.

Figure 13:
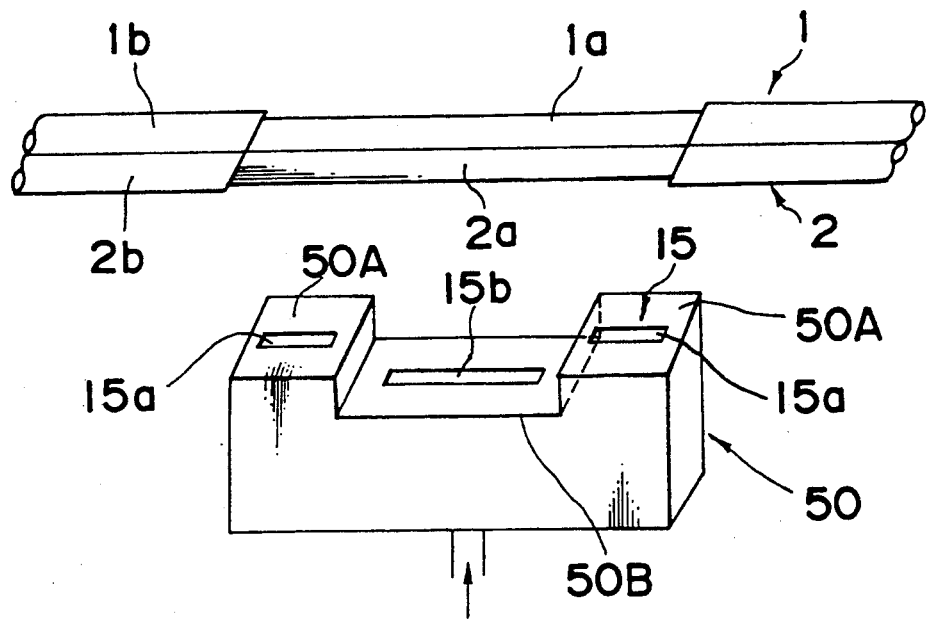
FIG. 13 is a view similar to FIG. 11, particularly showing a fifth embodiment of the present invention.
Figure 14A:
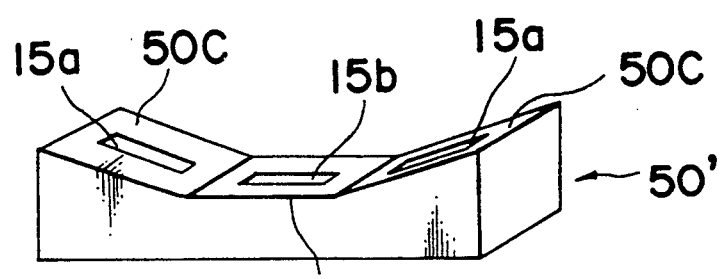
FIGS. 14a to 14c are perspective views of gas burners which are first to third modifications of the gas burner of FIG. 13, respectively.
Figure 14B:
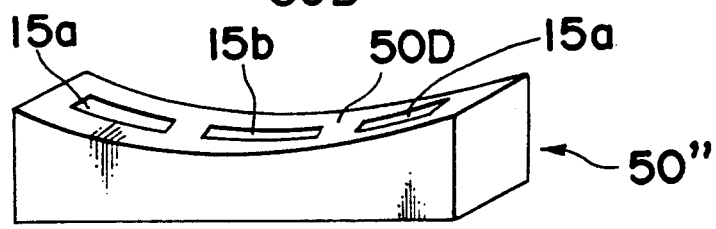
Figure 14C:
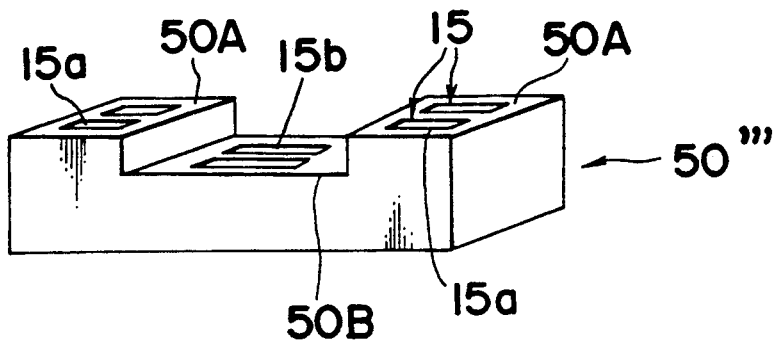

In addition, FIG. 13 shows a substantially U-shaped gas burner 50 employed in a production method according to a fifth embodiment of the present invention, while FIGS. 14a to 14c show gas burners 50' to 50''' which are first to third modifications of the gas burner 50, respectively. The gas burners 50 and 50' to 50''' are similar to the gas burners 40 and 40' to 40', respectively and have burner bodies identical with those of the gas burners 40 and 40' to 40''', i.e. those of the gas burners 30 and 30' to 30''', respectively. In the gas burners 50 and 50' to 50''', the slitlike gas nozzle 15 is divided into a pair of opposite slitlike gas nozzles 15a and a central slitlike gas nozzle 15b. Since other constructions of the gas burners 50 and 50' to 50''' are similar to those of the gas burners 40 and 40' to 40''', respectively, description thereof is abbreviated for the sake of brevity.

In accordance with the fifth embodiment of the present invention, the optical fiber couplers having excellent characteristics can be produced stably in the same manner as in the third embodiment of the present invention.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a method of producing an optical fiber coupler, in which a plurality of optical fibers are arranged in parallel with each other, glass portions of the optical fibers are heated so as to be fusion bonded to each other integrally and then, the integral glass portions are heated so as to be stretched, the method comprising:
providing a gas burner which acts as a heating device and has a plurality of gas nozzles arranged in parallel with an axial direction of the optical fibers so as to be fixed in position during heating of the glass portions;
the gas nozzles including first gas nozzles disposed at opposite end portions of the gas burner and second gas nozzles disposed at a central portion of the gas burner such that the second gas nozzles are spaced farther away from the glass portions than the first gas nozzles are.

2. A method as claimed in claim 1, wherein the opposite end portions of the gas burner have a pair of flat upper faces, respectively and the central portion of the gas burner has a recessed flat upper face such that the first and second gas nozzles are, respectively, provided on the flat upper faces and the recessed flat upper face.

3. A method as claimed in claim 1, wherein the central portion of the gas burner has a flat upper face and the opposite end portions of the gas burner have a pair of oblique upper faces inclined downwardly towards the flat upper face, respectively such that the first and second gas nozzles are, respectively, provided on the oblique upper faces and the flat upper face.

4. A method as claimed in claim 1, wherein the gas burner has a concavely arcuate upper face such that the gas nozzles are provided on the concavely arcuate upper face.

5. A method as claimed in claim 2, wherein the gas burner has a plurality of rows of the gas nozzles such that the rows extend in parallel with the axial direction of the optical fibers.

6. In a method of producing an optical fiber coupler, in which a plurality of optical fibers are arranged in parallel with each other, glass portions of the optical fibers are heated so as to be fusion bonded to each other integrally and then, the integral glass portions are heated so as to be stretched, the method comprising:
providing a gas burner which acts as a heating device and has a slitlike gas nozzle longitudinally extending in parallel with an axial direction of the optical fibers so as to be fixed in position during heating of the glass portions;
wherein the gas nozzle disposed at a central portion of the gas burner is spaced farther away from the glass portions then the gas nozzle disposed at opposite end portions of the gas burner.

7. A method as claimed in claim 6, wherein the opposite end portions of the gas burner have a pair of flat upper faces, respectively and the central portion of the gas burner has a recessed flat upper face such that the gas nozzle is provided on the flat upper faces and the recessed flat, upper face.

8. A method as claimed in claim 6, wherein the central portion of the gas burner has a flat upper face and the opposite end portions of the gas burner have a pair of oblique upper faces inclined downwardly towards the flat upper face, respectively such that the gas nozzle is provided on the oblique upper faces and the flat upper face.

9. A method as claimed in claim 6, wherein the gas burner has a concavely arcuate upper face such that the gas nozzle is provided on the concavely arcuate, upper face.

10. A method as claimed in claim 7, wherein the gas burner has a plurality of rows of the gas nozzles such that the rows extend in parallel with the axial direction of the optical fibers.

11. In a method of producing an optical fiber coupler, in which a plurality of optical fibers are arranged in parallel with each other, glass portions of the optical fibers are heated so as to be fusion bonded to each other integrally and then, the integral glass portions are heated so as to be stretched, the method comprising:
providing a gas burner which acts as a heating device and has a pair of first slitlike gas nozzles and a second slitlike gas nozzle arranged in parallel with an axial direction of the optical fibers so as to be fixed in position during heating of the glass portions;
the first slitlike gas nozzles being, respectively, disposed at opposite end portions of the gas burner, while the second slitlike gas nozzle is disposed at a central portion of the gas burner such that the second slitlike gas nozzle is spaced farther away from the glass portions than the first slitlike gas nozzles are.

12. A method as claimed in claim 11, wherein the opposite end portions of the gas burner have a pair of flat upper faces, respectively and the central portion of the gas burner has a recessed flat upper face such that the first slitlike gas nozzles and the second slitlike gas nozzle are, respectively, provided on the flat upper faces and the recessed flat upper face.

13. A method as claimed in claim 11, wherein the central portion of the gas burner has a flat upper face and the opposite end portions of the gas burner have a pair of oblique upper faces inclined downwardly towards the flat upper face, respectively such that the first slitlike gas nozzles and the second slitlike gas nozzle are, respectively, provided on the oblique upper faces and the flat upper face.

14. A method as claimed in claim 11, wherein the gas burner has a concavely arcuate upper face such that the first slitlike gas nozzles and the second slitlike gas nozzle are provided on the concavely arcuate upper face.

15. A method as claimed in claim 12, wherein the gas burner has a plurality of rows of the first slitlike gas nozzles and the second slitlike gas nozzle such that the rows extend in parallel with the axial direction of the optical fibers.

16. An apparatus for producing an optical fiber coupler, in which a plurality of optical fibers are arranged in parallel with each other, glass portions of the optical fibers being heated so as to be fusion bonded to each other integrally and then, the integral glass portions being heated so as to be stretched, the apparatus comprising:

a gas burner which acts as a heating device and has a plurality of gas nozzles arranged in parallel with an axial direction of the optical fibers, said gas burner being fixed in position during heating of the glass portions;

the gas nozzles including first gas nozzles disposed at opposite end portions of the gas burner and second gas nozzles disposed at a central portion of the gas burner such that the second gas nozzles are spaced farther away from the glass portions than the first gas nozzles are when the glass portions are being heated.

17. In an apparatus for producing an optical fiber coupler, in which a plurality of optical fibers are arranged in parallel with each other, glass portions of the optical fibers being heated so as to be fusion bonded to each other integrally and then, the integral glass portions being heated so as to be stretched, the apparatus comprising:

a gas burner which acts as a heating device and has a slitlike gas nozzle longitudinally extending in parallel with an axial direction of the optical fibers, said gas burner being fixed in position during heating of the glass portions;

wherein the gas nozzle disposed at a central portion of the gas burner is spaced farther away from the glass portions than the gas nozzle disposed at opposite end portions of the gas burner, when the glass portions are being heated.

18. In an apparatus for producing an optical fiber coupler, in which a plurality of optical fibers are arranged in parallel with each other, glass portions of the optical fibers being heated so as to be fusion bonded to each other integrally and then, the integral glass portions being heated so as to be stretched, the apparatus comprising:

a gas burner which acts as a heating device and has a pair of first slitlike gas nozzles and a second slitlike gas nozzle arranged in parallel with an axial direction of the optical fibers, said gas burner being fixed in position during heating of the glass portions;

the first slitlike gas nozzles being, respectively, disposed at opposite end portions of the gas burner, while the second slitlike gas nozzle is spaced farther away from the glass portions than the first slitlike gas nozzles are when the glass portions are being heated.

* * * * *

UNITED STATES PATENT AND TRADEMARK OFFICE
CERTIFICATE OF CORRECTION

PATENT NO. : 5,205,851
DATED : April 27, 1993
INVENTOR(S) : H. SUGANUMA et al.

It is certified that error appears in the above-indentified patent and that said Letters Patent is hereby corrected as shown below:

On the cover, section [56], under "FOREIGN PATENT DOCUMENTS", change "1249463" to ---1279463---.
At column 8, line 1 (claim 6, line 14), change "then" to ---than---.
At column 8, line 8 (claim 7, line 6), change "flat, upper" to ---flat upper---.
At column 8, line 18 (claim 9, line 3), change "arcuate, upper" to ---arcuate upper---.

Signed and Sealed this

Eighteenth Day of April, 1995

Attest:

BRUCE LEHMAN

*Attesting Officer*

*Commissioner of Patents and Trademarks*